US010760498B2

(12) United States Patent
Cannella et al.

(10) Patent No.: US 10,760,498 B2
(45) Date of Patent: Sep. 1, 2020

(54) SYSTEM AND METHOD FOR REMOVING ROTOR BOW IN A GAS TURBINE ENGINE USING MECHANICAL ENERGY STORAGE DEVICE

(71) Applicant: General Electric Company, Schenectady, NY (US)

(72) Inventors: Andrew Bryan Cannella, Salem, MA (US); Charles Stanley Orkiszewski, Cincinnati, OH (US); Milind Chandrakant Dhabade, Bangalore (IN); Praveen Sharma, Bangalore (IN); Brian Drummond, Swampscott, MA (US); Shivam Mittal, Bangalore (IN)

(73) Assignee: General Electric Company, Schenectady, NY (US)

( * ) Notice: Subject to any disclaimer, the term of this patent is extended or adjusted under 35 U.S.C. 154(b) by 244 days.

(21) Appl. No.: 15/861,780

(22) Filed: Jan. 4, 2018

(65) Prior Publication Data
US 2019/0203646 A1 Jul. 4, 2019

(51) Int. Cl.
*F02C 7/275* (2006.01)
*F01D 19/02* (2006.01)
(Continued)

(52) U.S. Cl.
CPC .............. *F02C 7/275* (2013.01); *F01D 19/02* (2013.01); *F01D 25/34* (2013.01); *F02C 6/14* (2013.01); *F02N 5/02* (2013.01); *F03G 1/00* (2013.01); *F16D 43/14* (2013.01); *F05D 2220/60* (2013.01); *F05D 2260/42* (2013.01)

(58) Field of Classification Search
CPC .......... F01D 25/34; F01D 25/36; F01D 19/00; F01D 19/02; F01D 21/00; F01D 21/04; F01D 21/06; F01D 21/08; F01D 21/006; F02C 7/26; F02C 7/268; F02C 7/275; F02C 7/32; F02C 6/14; F05D 2260/42;
(Continued)

(56) References Cited

U.S. PATENT DOCUMENTS 3,094,311 A 6/1963 Goldstein
3,793,905 A 2/1974 Black et al.
(Continued)

FOREIGN PATENT DOCUMENTS

EP 2305986 A2 4/2011
GB 1529980 A 10/1978
(Continued)

*Primary Examiner* — Andrew H Nguyen
*Assistant Examiner* — Stephanie Cheng
(74) *Attorney, Agent, or Firm* — Dority & Manning, P.A.

(57) ABSTRACT

The present disclosure is directed to a gas turbine engine structure and method for reducing or mitigating bowed rotor. The method includes coupling a rotor assembly to a mechanical energy storage device via a clutch mechanism when the rotor assembly is at or below a speed limit below an idle speed condition; storing mechanical energy at the mechanical energy storage device via rotation of the rotor assembly at or below the speed limit; releasing mechanical energy from the mechanical energy storage device to rotate the rotor assembly following shutdown of the gas turbine engine; and rotating the rotor assembly via the mechanical energy from the mechanical energy storage device.

20 Claims, 4 Drawing Sheets

(51) Int. Cl.
*F02N 5/02* (2006.01)
*F16D 43/14* (2006.01)
*F01D 25/34* (2006.01)
*F03G 1/00* (2006.01)
*F02C 6/14* (2006.01)

(58) Field of Classification Search
CPC ........... F05D 2260/43; F05D 2260/406; F05D 2260/52; F05D 2220/60; F02N 5/02; F03G 1/00
See application file for complete search history.

(56) References Cited

U.S. PATENT DOCUMENTS

| | | | |
|---|---|---|---|
| 4,854,120 A | 8/1989 | Nelson et al. | |
| 7,434,406 B2 | 10/2008 | Herlihy et al. | |
| 7,654,238 B2 * | 2/2010 | Steiner | F02B 77/087 |
| | | | 123/179.1 |
| 8,419,351 B2 | 4/2013 | Richards | |
| 8,776,530 B2 | 7/2014 | Shirooni et al. | |
| 8,820,046 B2 | 9/2014 | Ross et al. | |
| 9,121,309 B2 | 9/2015 | Geiger | |
| 9,239,106 B2 | 1/2016 | Schneider et al. | |
| 9,664,070 B1 | 5/2017 | Clauson et al. | |
| 10,378,442 B2 * | 8/2019 | Jackowski | F02C 9/26 |
| 2011/0154805 A1 * | 6/2011 | Heathco | F01D 15/10 |
| | | | 60/226.1 |
| 2014/0318144 A1 | 10/2014 | Lazzeri et al. | |
| 2014/0373553 A1 | 12/2014 | Zaccaria et al. | |
| 2017/0234167 A1 | 8/2017 | Stachowiak et al. | |
| 2019/0186359 A1 * | 6/2019 | Stevenson | F02C 7/32 |

FOREIGN PATENT DOCUMENTS

| | | | | |
|---|---|---|---|---|
| GB | 2564426 A * | 1/2019 | ............. | F04D 19/04 |
| WO | WO-2010067172 A2 * | 6/2010 | ............. | F02K 3/06 |

* cited by examiner

SYSTEM AND METHOD FOR REMOVING ROTOR BOW IN A GAS TURBINE ENGINE USING MECHANICAL ENERGY STORAGE DEVICE

FIELD

The present subject matter is directed generally to systems and methods for reducing or eliminating thermal bowing in gas turbine engines.

BACKGROUND

Gas turbine engines, such as those providing propulsion for aircraft, generate heat at the rotor assemblies during operation. Following shutdown of the engine, the rotor assembly is stationary (i.e., not rotating), which generally results in asymmetric heat distribution or thermal gradients circumferentially and/or axially along the rotor assembly. Such thermal gradients may generally result in thermal bowing or bowed rotor, such as along the radial, axial, and/or circumferential directions. Bowed rotor results in relatively large eccentricity relative to one or more casings surrounding the rotor assembly. As such, when a rotor assembly resumes operation, such eccentricity may generally cause the rotor assembly to operate with undesirable magnitudes of vibrations such as to damage surrounding casings, bearing assemblies, load structures, etc. Furthermore, such operation of the engine may result in airfoil blade tips rubbing into the surrounding casing, resulting in damage to the blades, the casings, or both.

Known methods to reduce rotor bow include allowing the rotor assembly to rest until the thermal gradient has naturally decreased over time such as to remove or eliminate the bowed rotor condition. However, in various instances, an engine may need to restart sooner than free convection heat transfer may allow. As such, there is a need for systems for reducing the thermal gradient of the rotor assembly such as to mitigate rotor bow in gas turbine engines.

BRIEF DESCRIPTION

Aspects and advantages of the invention will be set forth in part in the following description, or may be obvious from the description, or may be learned through practice of the invention.

The present disclosure is directed to a method for reducing or mitigating bowed rotor. The method includes coupling a rotor assembly to a mechanical energy storage device via a clutch mechanism when the rotor assembly is at or below a speed limit below an idle speed condition; storing mechanical energy at the mechanical energy storage device via rotation of the rotor assembly at or below the speed limit; releasing mechanical energy from the mechanical energy storage device to rotate the rotor assembly following shutdown of the gas turbine engine; and rotating the rotor assembly via the mechanical energy from the mechanical energy storage device.

In various embodiments, storing mechanical energy at the mechanical energy storage device further includes displacing a mechanical energy displacement device of the mechanical energy storage device. In one embodiment, displacing a mechanical energy displacement device further includes compressing or tensioning a spring mechanically coupled to the rotor assembly, to rotate the rotor assembly. In another embodiment, releasing mechanical energy from the mechanical energy storage device further includes decompressing or de-tensioning a spring mechanically coupled to the rotor assembly. In still various embodiments, displacing a mechanical energy displacement device further includes pressurizing a fluid within a pneumatic or hydraulic system, in which changes in pressure of the fluid rotates the rotor assembly. In one embodiment, releasing mechanical energy from the mechanical energy storage device further includes changing a pressure of the fluid within the pneumatic or hydraulic system to induce rotation of the rotor assembly.

In one embodiment, releasing mechanical energy from the mechanical energy storage device includes intermittent release of mechanical energy to partially rotate the rotor assembly.

In another embodiment, releasing mechanical energy from the mechanical energy storage device includes continuous release of mechanical energy to at least partially rotate the rotor assembly. In one embodiment, partial revolution movement of the rotor assembly defines approximately 0.5 revolutions or less of the rotor assembly.

In various embodiments, the method further includes decelerating rotation of the rotor assembly from above a speed limit to approximately zero revolutions per minute (RPM). In one embodiment, coupling a rotor assembly to a mechanical energy storage device further includes engaging a centrifugal clutch of the clutch mechanism at or below the speed limit, wherein the centrifugal clutch couples the rotor assembly to the mechanical energy storage device.

In one embodiment, releasing mechanical energy from the mechanical energy storage device to rotates the rotor assembly following a first period of time during which a bowed rotor condition develops following shutdown of the rotor assembly.

In another embodiment, the speed limit at or below which the rotor assembly is coupled to the mechanical energy storage device is less than or equal to 50% of the idle speed condition.

Another aspect of the present disclosure is directed to a gas turbine engine including a rotor assembly comprising a driveshaft extended along a longitudinal direction and a rotor extended along a radial direction from the driveshaft; and a mechanical energy storage device selectively coupled to a clutch mechanism. The clutch mechanism is coupled to the rotor assembly and the mechanical energy storage device when the rotor assembly is at or below a speed limit defined below an idle speed condition. The clutch mechanism is decoupled from at least one of the rotor assembly or the mechanical energy storage device when the rotor assembly is above the speed limit.

In various embodiments, the mechanical energy storage device defines, at least in part, a mechanical energy displacement device. Displacement of the mechanical energy displacement device rotates the rotor assembly. In one embodiment, the mechanical energy displacement device defines, at least in part, a spring coupled to the clutch mechanism, in which compression or tension of the spring induces rotation of the rotor assembly. In another embodiment, the mechanical energy displacement device defines, at least in part, a fluid system. Changes in pressure of a fluid in the fluid system rotates the rotor assembly.

In still various embodiments, the mechanical energy storage device further comprises a timing mechanism. The timing mechanism releases mechanical energy stored with the mechanical energy storage device to rotate the rotor assembly. In one embodiment, the timing mechanism defines a clock gear assembly to intermittently release mechanical energy stored with the mechanical energy storage device to intermittently rotate the rotor assembly.

In one embodiment, the clutch mechanism defines a centrifugal clutch. The centrifugal clutch couples the rotor assembly to the mechanical energy storage device when the rotor assembly rotates at or below the speed limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of systems and methods for reducing rotor bow in gas turbine engines are generally provided. The systems and methods generally shown and described herein enable rotation of a rotor assembly, such as a high pressure (HP) spool of a gas turbine engine, following shutdown such as to reduce a thermal gradient circumferentially and/or axially across the rotor assembly, thereby mitigating thermal bowing of the rotor assembly. The systems and methods generally release a stored energy to rotate the rotor assembly following shutdown of the gas turbine engine. Rotating the rotor assembly following shutdown enables repositioning the rotor assembly circumferentially such that warmer portions are disposed proximate to cooler portions within the casing, and cooler portions are disposed proximate to warmer portions within the casing, thereby reducing the thermal difference between warmer and cooler portions of the rotor assembly, which may thereby reduce or eliminate thermal bowing.

Figure 1:
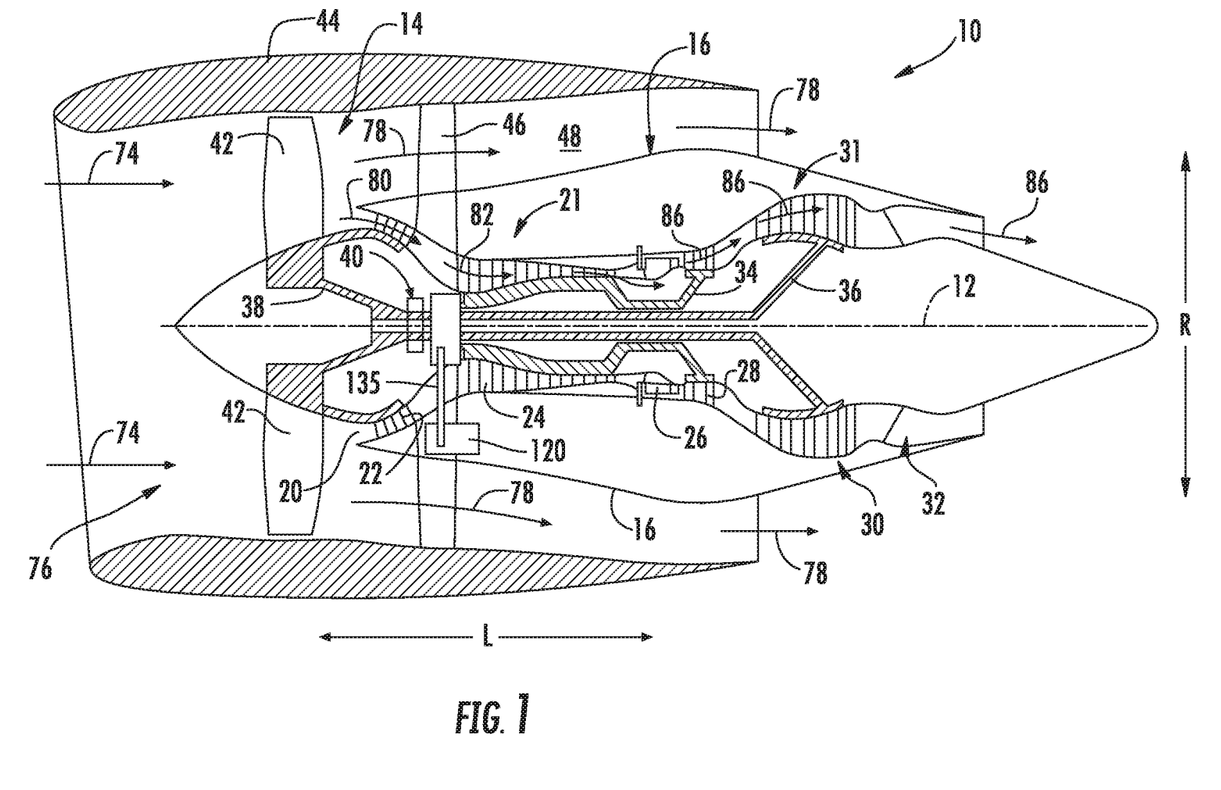
FIG. 1 is an exemplary embodiment of a gas turbine engine according to an aspect of the present disclosure.

Referring now to the drawings, FIG. 1 is a schematic cross sectional view of an exemplary gas turbine engine 10 (herein referred to as "engine 10"), shown as a high bypass turbofan engine incorporating structures and methods of mitigating thermal bowing of a rotor assembly according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. Still further, although generally shown as a two-spool gas turbine engine, the present disclosure may be applied to a three spool or more gas turbine engine, such as defining a low pressure (LP) spool, one or more intermediate pressure (IP) spools, and a high pressure (HP) spool.

As shown in FIG. 1, the engine 10 has a longitudinal or axial centerline axis 12 that extends there through for reference purposes generally along a longitudinal direction L. The engine 10 further defines a radial direction R extended from the axial centerline axis 12. In general, the engine 10 may include a substantially tubular outer casing 16 that defines an annular inlet 20. The outer casing 16 encases or at least partially flows, in serial flow arrangement, a compressor section 21, a combustion section 26, and a turbine section 31. In the embodiment shown in FIG. 1, the compressor section 21 defines a high pressure (HP) compressor 24 coupled to a HP shaft 34, and a low or intermediate pressure compressor 22 in serial arrangement with the HP compressor 24. The turbine section 31 defines a HP turbine 28 coupled to the HP shaft 34 to extract energy from combustion gases 86 to drive the HP shaft 34 and HP compressor 24. The HP compressor 24, the HP shaft 34, and the HP turbine 28 may together define a HP spool of the engine 10.

A fan assembly 14 is disposed forward or upstream of the compressor section 21. The fan assembly 14 includes a fan rotor 38. The fan rotor 38 includes one or more fan stages, in which each fan stage defines a plurality of propeller or fan blades 42 that are coupled to and extend outwardly from the fan rotor 38 in the radial direction R. In one embodiment as shown in FIG. 1, the fan rotor 38 defines a single fan stage or single circumferentially adjacent arrangement of the plurality of blades 42. In various other embodiments, the fan assembly 14 may further define a plurality of the stages. The fan rotor 38 is together rotatable about the axial centerline 12. An annular fan casing or nacelle 44 circumferentially surrounds at least a portion of the fan assembly 14 and/or at least a portion of the outer casing 16. In one embodiment, the nacelle 44 may be supported relative to the outer casing 16 by a plurality of circumferentially-spaced outlet guide vanes or struts 46. At least a portion of the nacelle 44 may extend over an outer portion (in radial direction R) of the outer casing 16 so as to define a bypass airflow passage 48 therebetween.

The turbine section 31 further defines a LP turbine 30 generally downstream of the HP turbine 28. In the embodiment generally provided in FIG. 1, the LP turbine 30 is coupled to a LP shaft 36 to which the LP compressor 22 is coupled. The LP turbine 30 extracts energy from combustion gases 86 to drive the LP compressor 22. In various embodiments, the fan rotor 38 and fan blades 42 are coupled to the LP shaft 36 such as to define a direct drive configuration such that the LP turbine 30 rotates at a generally similar rotational speed as the LP compressor 22 and fan rotor 38. In other embodiments, such as generally provided in FIG. 1, a speed reduction device 40 is coupled to the LP shaft 36 and the fan rotor 38 to define an indirect drive configuration. The indirect drive configuration generally enables a different rotational speed of the fan rotor 38 relative to the LP shaft 36 and LP turbine 30 from which energy is provided. For example, the speed reduction device 40 may define a reduction or power gear assembly, such as, but not limited to, a planetary gear assembly. The LP turbine 30, the LP shaft 36, and one or more of the LP compressor 22 and/or fan assembly 14 may together define a LP spool of the engine.

Referring still to FIG. 1, the engine 10 may generally include an exhaust nozzle 32 coupled downstream to the turbine section 31 to direct the flow of combustion gases 86 from the engine 10.

During operation of the engine 10, as shown in FIG. 1, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 31, causing rotary members of the turbine section 31 to rotate and support operation of respectively coupled rotary members in the compressor section 21 and/or fan assembly 14.

Figure 2:
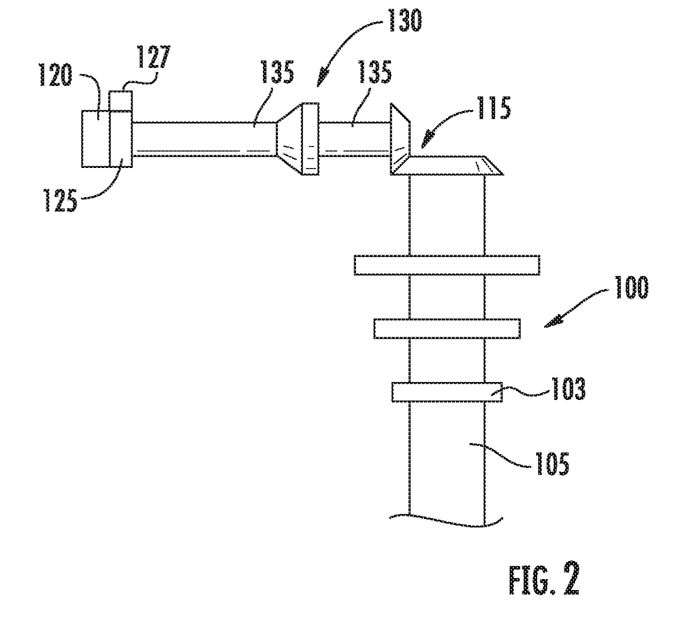
FIGS. 2-3 are schematic embodiments of a portion of the gas turbine engine of FIG. 1 further depicting embodiments of a clutch assembly of the present disclosure.
Figure 3:
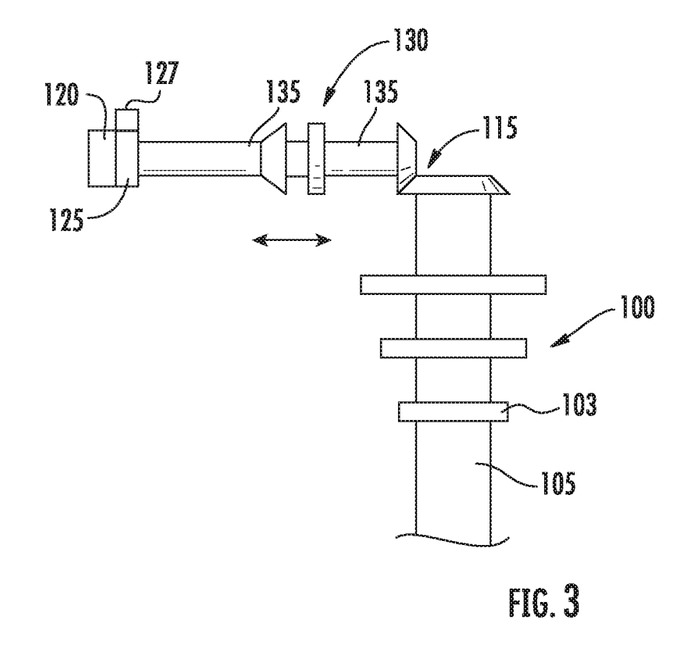

Referring now to FIGS. 2-3, exemplary schematic embodiments of a portion of the engine 10 are generally provided. The engine 10 includes a rotor assembly 100 defined by one or more of the HP spool, the IP spool, or the LP spool described in regard to FIG. 1. The rotor assembly 100 includes a driveshaft 105 extended along a longitudinal direction and a rotor 103 extended along a radial direction from the driveshaft 105. In various embodiments, the driveshaft 105 defines the HP shaft 34 or the LP shaft 36, such as described in regard to FIG. 1. The rotor 103 may define a hub or disk into which a plurality of airfoils are installed, or a bladed disk or integrally bladed rotor.

The engine 10 further includes a mechanical energy storage device 120 selectively coupled to a clutch mechanism 130. Referring to FIG. 2, the clutch mechanism 130 is coupled to the rotor assembly 100 and the mechanical energy storage device 120 when the rotor assembly 100 is at or below a speed limit defined below an idle speed condition. Referring to FIG. 3, the clutch mechanism 130 is further decoupled from at least one of the rotor assembly 100 or the mechanical energy storage device 120 when the rotor assembly 100 is above the speed limit.

Referring now to FIGS. 2-3, in various embodiments, the mechanical energy storage device 120 defines, at least in part, a mechanical energy displacement device 125. For example, displacement of the mechanical energy displacement device 125 induces rotation of the rotor assembly 100. In one embodiment, rotation of the rotor assembly 100 is via a release of energy from the mechanical energy displacement device 125. For example, rotation of the rotor assembly 100 may occur via rotation of a shaft 135 coupled to the driveshaft 105. As another example, the mechanical energy storage device 120 is configured to send and extract energy via one or more gears of a first gear assembly 115 coupled to the rotor assembly 100. In various embodiments, the first gear assembly 115 may define one or more bevel gears to provide or extract energy to/from the rotor assembly 100 as well as dispose the mechanical energy storage device 120 radially outward of the rotor assembly 100.

Figure 4:
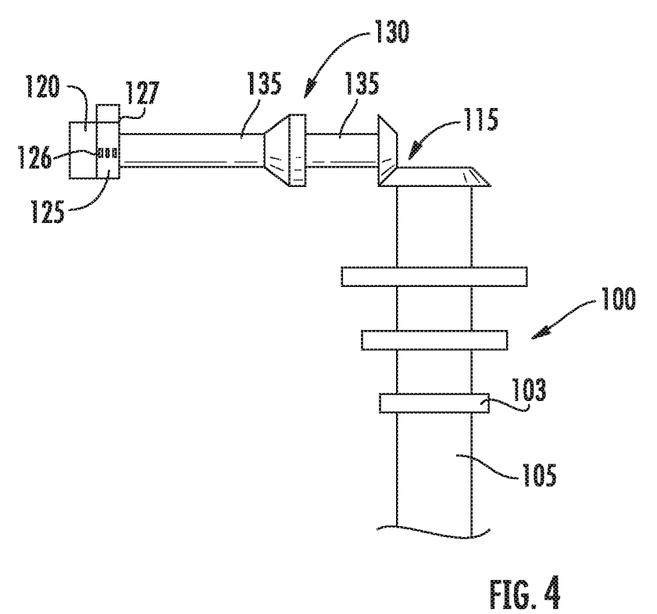
FIGS. 4-5 are additional schematic embodiments of a portion of the gas turbine engine of FIG. 1 further depicting embodiments of a clutch assembly of the present disclosure.

Referring now to FIG. 4, another exemplary embodiment of a portion of the engine 10 (FIG. 1) is generally provided. The embodiment generally provided in FIG. 4 is configured substantially similarly as described and shown in regard to FIGS. 2-3. In one embodiment, the mechanical energy displacement device 125 defines, at least in part, a spring 126 coupled to the clutch mechanism 130. Release of mechanical energy from the spring 126 induces rotation of the rotor assembly 100 when the mechanical energy storage device 120 is coupled to the rotor assembly 100. For example, compression or tension of the spring 126 induces rotation of the rotor assembly 100. As another example, release of mechanical energy from the spring 126 rotates the rotor assembly 100 via the shaft 135 and clutch mechanism 130 coupled to the rotor assembly 100. Still further, release of mechanical energy from the spring 126 rotates the rotor assembly 100 via the first gear assembly 115.

Referring still to FIGS. 2-3, the mechanical energy storage device 120 may further include a timing mechanism 127. The timing mechanism 127 controls a release of mechanical energy stored at the mechanical energy storage device 120, such as stored at the mechanical energy displacement device 125. For example, the timing mechanism 127 controls a release of mechanical energy to rotate the rotor assembly 100 continuously, intermittently, or combinations thereof, over a period of time. In one embodiment, the timing mechanism 127 defines a clock gear assembly to intermittently release mechanical energy stored with the mechanical energy storage device 120 to intermittently rotate the rotor assembly 100.

Figure 5:
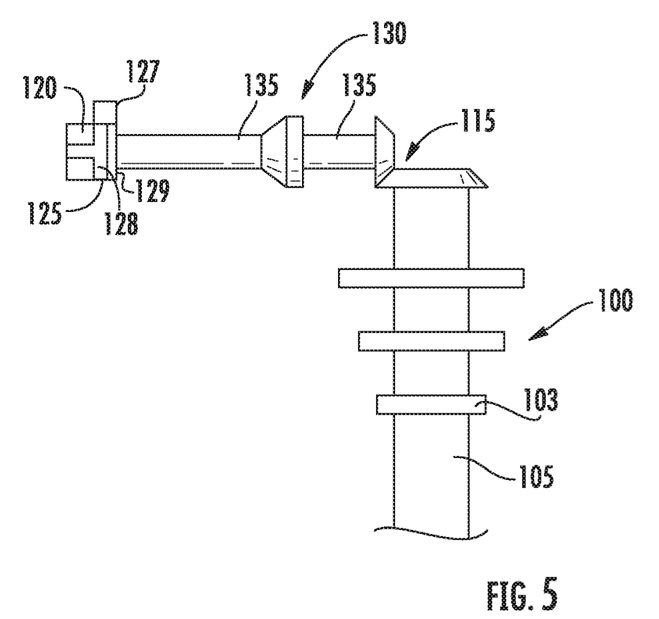

Referring now to FIG. 5, another exemplary embodiment of a portion of the engine 10 (FIG. 1) is generally provided. The embodiment generally provided in FIG. 5 is configured substantially similarly as described and shown in regard to FIGS. 2-3 and FIG. 4. In various embodiments of the portion of the engine 10 generally provided in FIG. 5, the mechanical energy displacement device 125 defines, at least in part, a fluid system 128. In one embodiment, the fluid system 128 defines a hydraulic or pneumatic fluid system, such as including a pressure changing manifold, cylinder, or piston, and a fluid 129. Changes in pressure of the fluid 129 in the fluid system 128 provide motive force to rotate the rotor assembly 100. In various embodiments, the fluid 129 may be a liquid or gaseous fuel, a lubricant (e.g., oil), a hydraulic fluid, air, or another gas, or combinations thereof.

Referring now to FIGS. 2-5, in various embodiments, the clutch mechanism 130 may define a centrifugal clutch. The clutch mechanism 130 defining a centrifugal clutch couples the rotor assembly 100 to the mechanical energy storage device 120 when the rotor assembly 100 rotates at or below the speed limit. For example, during shutdown of the engine 10, the clutch mechanism 130 defining a centrifugal clutch may engage the mechanical energy storage device 120 to the rotor assembly 100 when the rotor assembly 100 is at or below a speed limit. In various embodiments, the speed limit may be defined at one or more idle or sub-idle conditions, including, but not limited to, one or more speeds during deceleration of the rotor assembly 100 below idle condition following cessation of fuel flow and production of combustion gases 86. For example, in various embodiments, the speed limit may be defined as approximately 98% or less of the idle speed of the engine 10 and greater than zero revolutions per minute (RPM). As another example, in one embodiment, the speed limit at or below which the rotor assembly 100 is coupled to the mechanical energy storage device 120 is less than or equal to approximately 50% of the idle speed of the engine 10.

Figure 6:
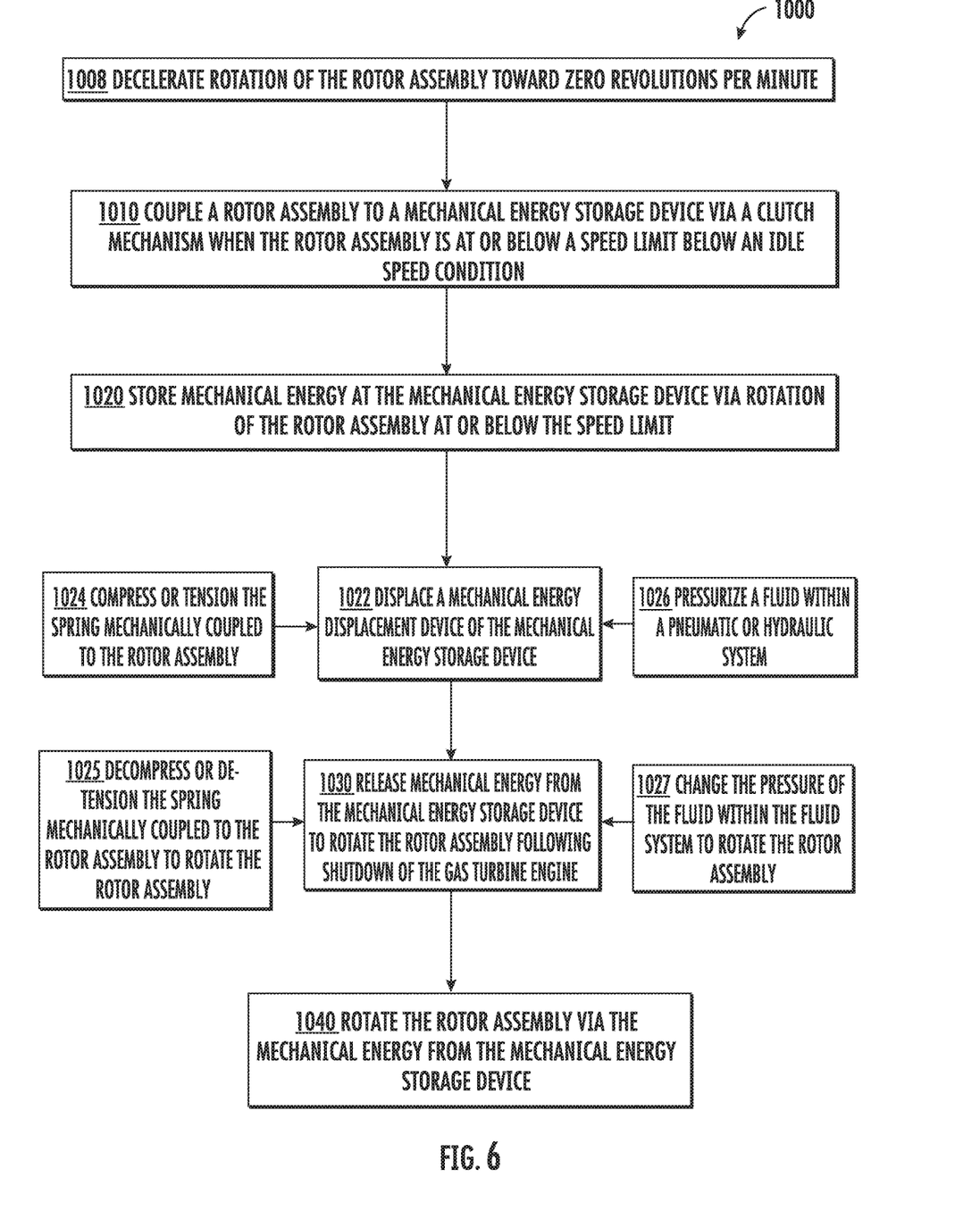
FIG. 6 is a flowchart outlining exemplary steps of a method for mitigating rotor bow in a gas turbine engine.

Referring now to FIG. 6, an exemplary flowchart outlining steps of a method for mitigating, reducing, or eliminating rotor bow in a gas turbine engine is generally provided (hereinafter, "method 1000"). Embodiments of the method 1000 may generally be utilized or implemented with embodiments of the engine 10 generally provided in FIGS. 1-5. Still further, embodiments of the engine 10 and the method 1000 described further herein may provide further embodiments or methods for operation of the engine 10 generally provided in FIGS. 1-5. However, it should be appreciated that the method 1000 described herein may be utilized or implemented with other embodiments of a gas turbine engine, such as, but not limited to, turbofan, turboprop, and turboshaft gas turbine engines, including single spool, two spool, three spool, or more, gas turbine engines. Furthermore, the method 1000 includes steps presented in a sequence. However, it should be appreciated that steps of the method 1000 may be re-arranged, re-ordered, re-sequenced, altered, omitted, or added to without removing from the scope of the present disclosure.

Referring now to FIGS. 1-6, the method 1000 includes at 1010 coupling a rotor assembly to a mechanical energy storage device via a clutch mechanism when the rotor assembly is at or below a speed limit below an idle speed condition. For example, referring to FIGS. 2-5, coupling a rotor assembly to a mechanical energy storage device may include coupling the rotor assembly to the mechanical energy storage device 120 via the clutch mechanism 130. In various embodiments, such as described herein, the clutch mechanism 130 may define a centrifugal clutch that engages the rotor assembly at or below a speed limit and disengages the rotor assembly above the speed limit, such as described in regard to FIGS. 2-5.

In various embodiments, the method 1000 further includes at 1008 decelerating rotation of the rotor assembly toward zero revolutions per minute (RPM). For example, referring to FIGS. 1-6, operation of the engine 10 during which fuel and oxidizer are mixed and ignited to produce combustion gases 86 may be followed by cessation of flow of fuel to the combustion section 26, after which the rotor assembly 100 decelerates toward zero RPM. Deceleration of the rotor assembly 100 may begin above the speed limit described herein. Following deceleration to a speed at or below the speed limit, the clutch mechanism 130 couples the rotor assembly 100 to the mechanical energy storage device 120 into mechanical dependency, such as described in regard to FIGS. 1-6 and step 1010 of the method 1000. As such, the method 1000 may further include at 1012 engaging the clutch mechanism 130 at or below the speed limit, such as when the clutch mechanism 130 defines a centrifugal clutch to couple the rotor assembly 100 to the mechanical energy storage device 120 in mechanical dependency.

The method 1000 further includes at 1020 storing mechanical energy at the mechanical energy storage device via rotation of the rotor assembly at or below the speed limit. In various embodiments at 1020, the method 1000 further includes at 1022 displacing a mechanical energy displacement device of the mechanical energy storage device, such as described in regard to FIGS. 2-5. The method 1000 further includes at 1030 releasing mechanical energy from the mechanical energy storage device to rotate the rotor assembly following shutdown of the gas turbine engine; and at 1040 rotating the rotor assembly via the mechanical energy from the mechanical energy storage device.

In one embodiment in which the mechanical energy displacement device 125 defines, at least in part, the spring 126, such as generally provided in FIG. 4, the method 1000 further includes at 1024 compressing or tensioning the spring mechanically coupled to the rotor assembly. In various embodiments, during shutdown of the engine 10, such as after the rotor assembly 100 is mechanically engaged to the mechanical energy storage device 120 via the clutch mechanism 130 at or below the speed limit, the spring 126 may be compressed by rotation of the rotor assembly 100 as the rotor assembly 100 decelerates toward zero RPM. Compression of the spring 126 stores mechanical energy at the mechanical energy storage device 120. Following a period of time after the rotor assembly 100 is at zero RPM, the spring 126 decompresses and rotates the rotor assembly 100 via the shaft 135 and clutch mechanism 130.

In another embodiment, during shutdown of the engine 10, the spring 126 may be tensioned by rotation of the rotor assembly 100 as the rotor assembly 100 decelerates toward zero RPM. Tensioning of the spring 126 stores mechanical energy at the mechanical energy storage device 120. Following a period of time after the rotor assembly 100 is at zero RPM, the spring 126 de-tensions and rotates the rotor assembly 100 via the shaft 135 and clutch mechanism 130. As such, the method 1000 may further include at 1025 decompressing or de-tensioning the spring mechanically coupled to the rotor assembly to rotate the rotor assembly.

In still another embodiment, the method 1000 may further include at 1026 pressurizing a fluid within a pneumatic or hydraulic system. For example, the mechanical energy storage device 120 may define, at least in part, the fluid system 128 such as generally provided in regard to FIG. 5. Changes in pressure of the fluid 129 may rotate the rotor assembly 100. In one embodiment, during shutdown of the engine 10, the fluid 129 may be pressurized by the fluid system 128. For example, the shaft 135 coupled to the fluid system 128 and the rotor assembly 100 during deceleration toward zero RPM may displace a portion of the fluid system 128 such as to decrease a volume in which the fluid 129 is held, or otherwise increase pressure of the fluid 129 at the fluid system 128. As another example, a portion of air from the engine 10 may be directed to the fluid system 128 during deceleration as described above and contained under pressure.

In various embodiments of the method 1000, the step at 1030 may further include at 1027 changing the pressure of the fluid within the fluid system to rotate the rotor assembly. For example, such as described in regard to the spring 126, the rotor assembly 100 may be coupled to the mechanical energy displacement device 125 defining the fluid system 128 such that a force generated by the accumulated pressure of the fluid 129 at the fluid system 128 rotates the rotor assembly 100 as the mechanical energy displacement device 125 defining the fluid system 128 de-pressurizes.

In still various embodiments of the method 1000, releasing mechanical energy at 1030 may further include an intermittent release of mechanical energy to partially rotate the rotor assembly. For example, referring to FIGS. 2-5, the engine 10 may further include the timing mechanism 127. The timing mechanism 127 may control a release of the mechanical energy such as to provide intermittent release or bursts of energy from the mechanical energy storage device 120 to provide partial rotations of the rotor assembly 100.

In another embodiment, releasing mechanical energy at 1030 may further include a continuous release of mechanical energy to partially rotate the rotor assembly. For example, referring to FIGS. 2-5, the engine 10 may further include the timing mechanism 127 such as to control a release of the mechanical energy to provide continuous rotation of the rotor assembly 100 via the mechanical energy storage device 120. In one embodiment, the mechanical energy storage device 120, such as including the spring 126 or the fluid system 128, may rotate the rotor assembly 100 at approximately 0.5 RPM following shutdown of the engine 10 (i.e., following deceleration of the rotor assembly 100 to zero RPM). In another embodiment, the mechanical energy storage device 120 may rotate the rotor assembly 100 between approximately 0.2 RPM and approximately 0.5 RPM. In still various embodiments, the mechanical energy storage device 120 stores energy sufficient for approximately 20 revolutions of the rotor assembly 100. For example, the revolutions of the rotor assembly 100 may be disbursed at a rate between approximately 0.2 and approximately 0.5 RPM.

In still various embodiments, revolutions of the rotor assembly 100 may include a period of time between rotations. For example, in one embodiment, releasing mechanical energy at 1030 may occur at least following a first period of time during which a bowed rotor condition develops following shutdown of the rotor assembly. For example, following shutdown and rest (i.e., zero RPM) of the rotor assembly 100, a bowed rotor condition may develop within approximately 30 minutes thereafter. As such, the first period of time may be less than approximately 30 minutes, at which time the rotor assembly 100 is rotated by release of stored mechanical energy from the mechanical energy storage device 120. In one embodiment, rotation of the rotor assembly 100 may include a half rotation (i.e., 180 degrees). In another embodiment, following half rotation of the rotor assembly 100, the rotor assembly 100 may remain at the half-rotated position for a second period of time, such as until the bowed rotor condition is neutralized (i.e., defining a straightened or acceptable rotor condition safe for further operation of the engine 10). For example, in various embodiments, the second period of time may be approximately equal to the first period of time. In still another embodiment, the period of time between rotations may include a period of time between intermittent rotations of the rotor assembly 100.

Embodiments of the engine 10 and methods 1000 for reducing rotor bow at the rotor assembly 100 shown and described in regard to FIGS. 1-6 enable rotation of the rotor assembly 100, such as a high pressure (HP) spool of the engine 10, following shutdown such as to reduce a thermal gradient circumferentially and/or axially across the rotor assembly 100. Reduction of circumferential, radial, and/or axial temperature differences may mitigate, reduce, or eliminate thermal bowing of the rotor assembly 100. The engine 10 and methods 1000 shown and described herein generally release a stored energy to rotate the rotor assembly 100 following shutdown of the engine 10. The engine 10 and methods 1000 generally provided herein in regard to FIGS. 1-6 provide a method and structure for passive turning of the rotor assembly 100 following shutdown of the engine 10 to mitigate, reduce, or eliminate rotor bowing at the rotor assembly 100. Passive turning or rotation of the rotor assembly 100 enables mitigation, reduction, or elimination of thermal bowing of the rotor assembly 100 generally without control systems or manual operation or actuation. Rotating the rotor assembly 100 following shutdown enables circumferential repositioning the rotor assembly 100 such that warmer portions are disposed proximate to cooler portions within the outer casing 16, and cooler portions are disposed proximate to warmer portions within the outer casing 16. As such, thermal differences between warmer and cooler portions of the rotor assembly 100 are reduced, which may thereby mitigate, reduce, or eliminate thermal bowing of the rotor assembly 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing thermal bowing in a gas turbine engine, the method comprising:
    coupling a rotor assembly to a mechanical energy storage device via a clutch mechanism when the rotor assembly is rotating at or below a speed limit below an idle speed condition;
    storing mechanical energy at the mechanical energy storage device from the rotor assembly rotating at or below the speed limit;
    releasing the mechanical energy from the mechanical energy storage device to rotate the rotor assembly following shutdown of the gas turbine engine; and
    rotating the rotor assembly via the mechanical energy from the mechanical energy storage device.

2. The method of claim 1, wherein storing the mechanical energy at the mechanical energy storage device comprises:
    displacing a mechanical energy displacement device of the mechanical energy storage device.

3. The method of claim 2, wherein displacing the mechanical energy displacement device comprises:
    compressing or tensioning a spring mechanically coupled to the rotor assembly, wherein decompressing or de-tensioning the spring induces rotation of the rotor assembly.

4. The method of claim 3, wherein releasing the mechanical energy from the mechanical energy storage device comprises:
    decompressing or de-tensioning the spring mechanically coupled to the rotor assembly.

5. The method of claim 2, wherein displacing h mechanical energy displacement device comprises:

pressurizing a fluid within a pneumatic or hydraulic system, wherein changes in pressure of the fluid rotates the rotor assembly.

6. The method of claim 5, wherein releasing the mechanical energy from the mechanical energy storage device comprises:
changing the pressure of the fluid within the pneumatic or hydraulic system to induce rotation of the rotor assembly.

7. The method of claim 1, wherein releasing the mechanical energy from the mechanical energy storage device comprises intermittently releasing the mechanical energy to partially rotate the rotor assembly.

8. The method of claim 1, wherein releasing the mechanical energy from the mechanical energy storage device comprises continuous release of the mechanical energy to at least partially rotate the rotor assembly.

9. The method of claim 8, wherein the partial rotation of the rotor assembly comprises approximately 0.5 revolutions or less.

10. The method of claim 1, further comprising:
decelerating rotation of the rotor assembly from above the speed limit to approximately zero revolutions per minute (RPM).

11. The method of claim 10, wherein coupling the rotor assembly to the mechanical energy storage device comprises:
engaging a centrifugal clutch of the clutch mechanism at or below the speed limit, wherein the centrifugal clutch couples the rotor assembly to the mechanical energy storage device.

12. The method of claim 1, wherein releasing the mechanical energy from the mechanical energy storage device rotates the rotor assembly following a first period of time during which a bowed rotor condition develops following shutdown of the gas turbine engineer.

13. The method of claim 1, wherein the speed limit at or below which the rotor assembly is coupled to the mechanical energy storage device is less than or equal to 50% of the idle speed condition.

14. The gas turbine engine configured to reduce thermal bowing via the method of claim 1, the gas turbine engine comprising:
the rotor assembly comprising a driveshaft and a rotor extended from the driveshaft; and
the mechanical energy storage device selectively couplable to the clutch mechanism, wherein the mechanical energy storage device is configured to couple the rotor assembly to the mechanical energy storage device via the clutch mechanism when the rotor assembly is at or below the speed limit below the idle speed condition, and wherein the mechanical energy storage device is configured to store mechanical energy via rotation of the rotor assembly at or below the speed limit, and wherein the mechanical energy storage device is configured to rotate the rotor assembly via mechanical energy released from the mechanical energy storage device.

15. The gas turbine engine of claim 14, wherein the mechanical energy storage device comprises a spring coupled to the clutch mechanism, a timing mechanism, or both.

16. A gas turbine engine, the engine comprising:
a rotor assembly comprising a driveshaft and a rotor extended from the driveshaft; and
a mechanical energy storage device selectively coupled to a clutch mechanism to reduce or mitigate thermal bowing at the rotor assembly, wherein the mechanical energy storage device is configured to couple the rotor assembly to the mechanical energy storage device via the clutch mechanism when the rotor assembly is rotating at or below a speed limit below an idle speed condition, and wherein the mechanical energy storage device is configured to store mechanical energy from the rotor assembly rotating at or below the speed limit, and wherein the mechanical energy storage device is configured to rotate the rotor assembly via mechanical energy released from the mechanical energy storage device.

17. The gas turbine engine of claim 16, wherein the mechanical energy storage device comprises a spring mechanically coupled to the rotor assembly, wherein decompressing or de-tensioning the spring releases mechanical energy to rotate the rotor assembly.

18. The gas turbine engine of claim 16, wherein the mechanical energy storage device comprises a timing mechanism configured to intermittently rotate the rotor assembly via intermittent release of mechanical energy stored with the mechanical energy storage device.

19. The gas turbine engine of claim 16, wherein the mechanical energy storage device comprises a fluid system configured to rotate the rotor assembly via changing a pressure of a fluid within the fluid system to induce rotation of the rotor assembly.

20. The gas turbine engine of claim 16, wherein the clutch mechanism comprises a centrifugal clutch configured to selectively couple the rotor assembly to the mechanical energy storage device when the rotor assembly rotates at or below the speed limit.

* * * * *